United States Patent
Shibuya

(10) Patent No.: US 10,628,101 B2
(45) Date of Patent: Apr. 21, 2020

(54) PRINTING APPARATUS FOR REDUCING THE INHIBITION OF PRINTING WHEN A DELETION INSTRUCTION HAS BEEN ISSUED

(71) Applicant: CANON KABUSHIKI KAISHA, Tokyo (JP)

(72) Inventor: Yuichiro Shibuya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/242,965

(22) Filed: Jan. 8, 2019

(65) Prior Publication Data
US 2019/0227761 A1    Jul. 25, 2019

(30) Foreign Application Priority Data
Jan. 19, 2018  (JP) .................................. 2018-007185

(51) Int. Cl.
*G06F 15/00*    (2006.01)
*G06F 3/12*    (2006.01)
*G06K 1/00*    (2006.01)

(52) U.S. Cl.
CPC ............ *G06F 3/1274* (2013.01); *G06F 3/122* (2013.01); *G06F 3/1286* (2013.01)

(58) Field of Classification Search
CPC ....... G06F 3/1274; G06F 3/1286; G06F 3/122
USPC .............................. 358/1.1, 1.15, 1.13, 1.14
See application file for complete search history.

(56) References Cited

U.S. PATENT DOCUMENTS 10,110,770 B2 * 10/2018 Nakajima ............. G06F 3/1238
2005/0141023 A1 * 6/2005 Yagita .................... G06F 3/1212
358/1.15

FOREIGN PATENT DOCUMENTS

JP    2017-219970 A    12/2017

* cited by examiner

*Primary Examiner* — Douglas Q Tran
(74) *Attorney, Agent, or Firm* — Canon U.S.A., Inc. IP Division

(57) ABSTRACT

The printing apparatus deletes a deletion target print data even if the printing apparatus is in a predetermined state in a case where the number of pieces of deletion target print data that are registered and are not deleted yet reaches a predetermined number.

18 Claims, 9 Drawing Sheets

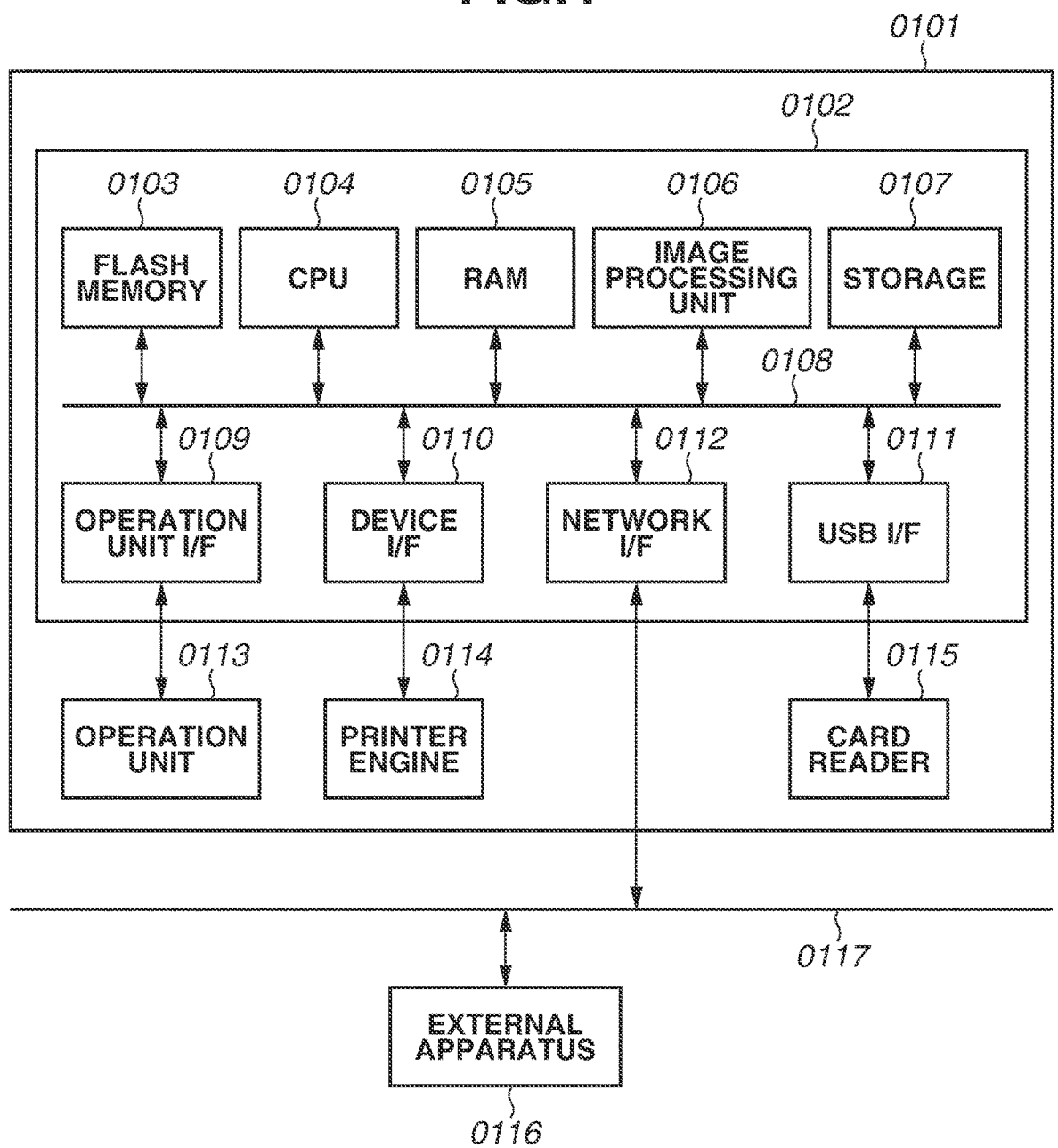

| JobID |
|---|
| MANAGEMENT DATA |
| SPEC INFORMATION |
| JobID |
| MANAGEMENT DATA |
| SPEC INFORMATION |
| ⋮ |
| JobID |
| MANAGEMENT DATA |
| SPEC INFORMATION |

| BoxID: 0 |
|---|
| BOX NAME |
| ⋮ |
| FIRST ENTRY NUMBER |
| LAST ENTRY NUMBER |
| TOTAL NUMBER OF ENTRIES |
| BoxID: 1 |
| BOX NAME |
| ⋮ |
| FIRST ENTRY NUMBER |
| LAST ENTRY NUMBER |
| TOTAL NUMBER OF ENTRIES |
| ⋮ |
| BoxID: 98 |
| BOX NAME |
| ⋮ |
| FIRST ENTRY NUMBER |
| LAST ENTRY NUMBER |
| TOTAL NUMBER OF ENTRIES |
| BoxID: 99 |
| BOX NAME |
| ⋮ |
| FIRST ENTRY NUMBER |
| LAST ENTRY NUMBER |
| TOTAL NUMBER OF ENTRIES |
| BoxID: 101 |
| BOX NAME = TrashBox |
| ⋮ |
| FIRST ENTRY NUMBER |
| LAST ENTRY NUMBER |
| TOTAL NUMBER OF ENTRIES |

| JobID |
|---|
| NEXT BOX ENTRY NUMBER |
| PREVIOUS BOX ENTRY NUMBER |
| JobID |
| NEXT BOX ENTRY NUMBER |
| PREVIOUS BOX ENTRY NUMBER |
| ⋮ |
| JobID |
| NEXT BOX ENTRY NUMBER |
| PREVIOUS BOX ENTRY NUMBER |

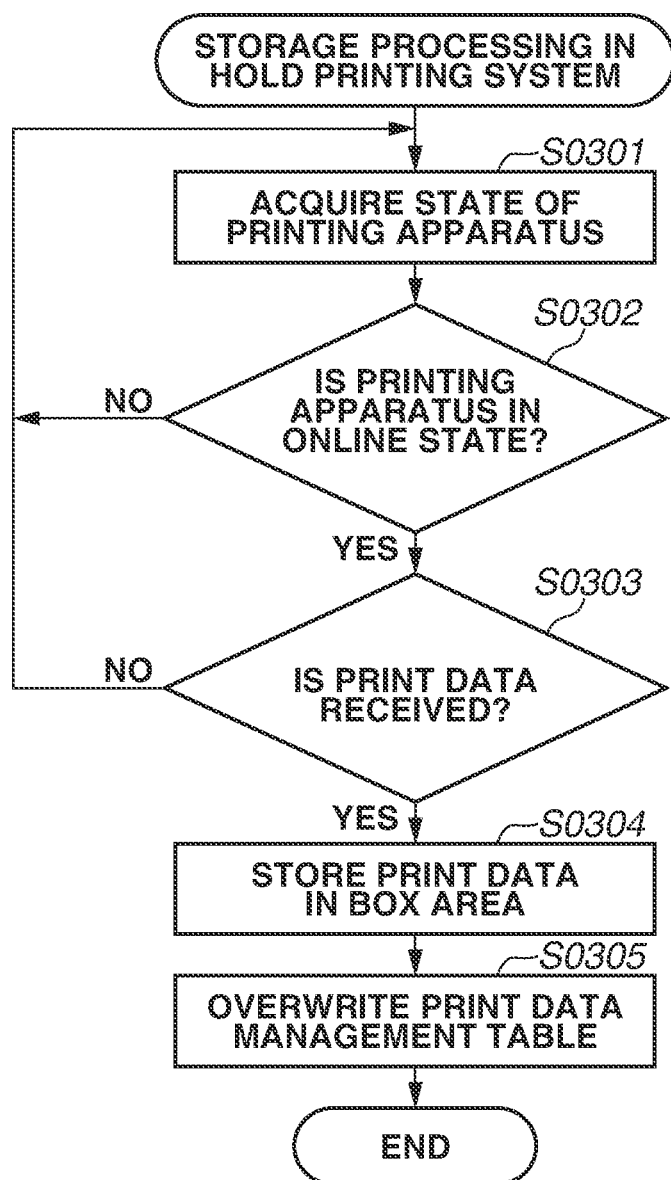

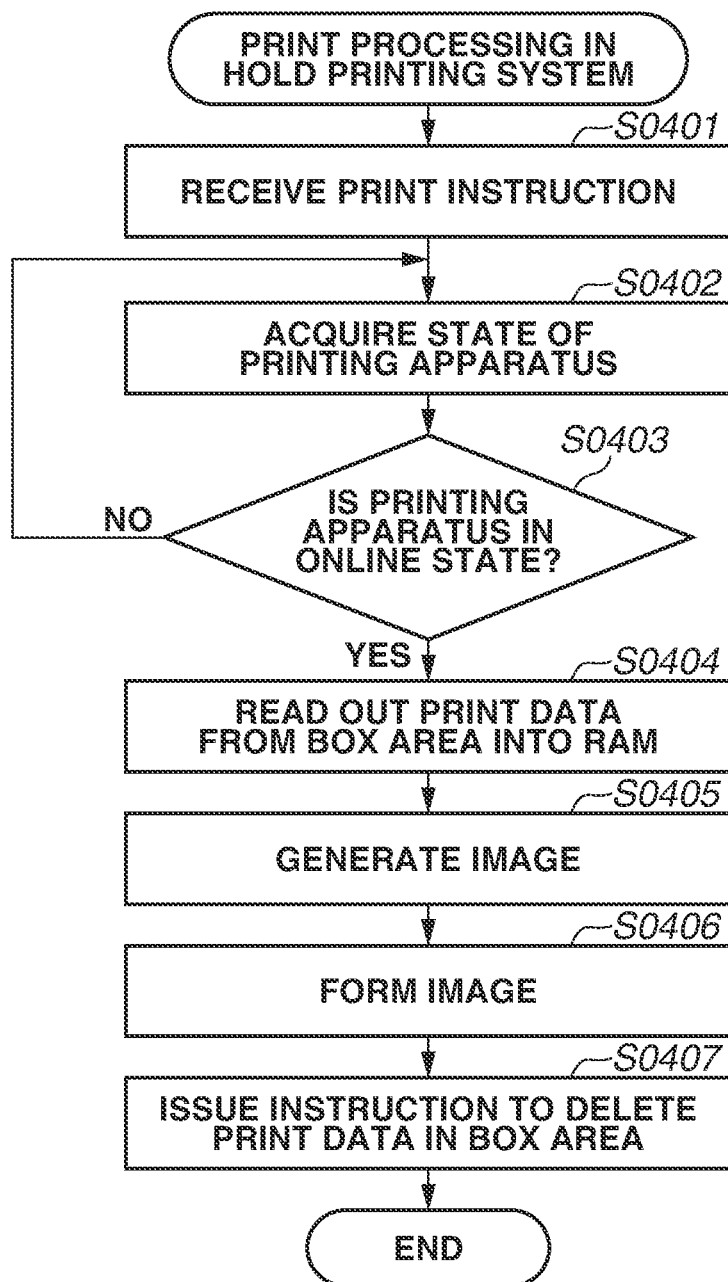

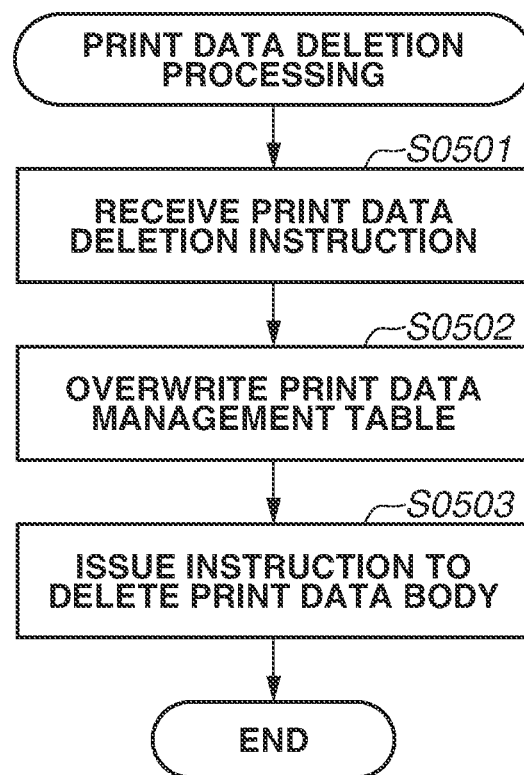

PRINTING APPARATUS FOR REDUCING THE INHIBITION OF PRINTING WHEN A DELETION INSTRUCTION HAS BEEN ISSUED

BACKGROUND OF THE INVENTION

Field of the Invention

The present invention relates to a printing apparatus and a storage medium.

Description of the Related Art

Some printing apparatuses, such as a multifunction peripheral and a printer, have a box function for storing print data received from an external apparatus via a network. In terms of security to, for example, prevent a printed material from being left behind, some printing apparatuses also have a hold printing function to temporarily hold input print data in a box area and output the print data when a user issues a print instruction via an operation unit of the printing apparatus. In the hold printing function, the box area of the printing apparatus is used as an area for temporarily storing print data, and thus the storage and deletion of print data is frequently performed as discussed in Japanese Patent Application Laid-Open No. 2017-219970.

There is a technique in which, in the box area of a printing apparatus, if a deletion instruction to delete print data is issued by a user or a system, only management information about the data to which the deletion instruction has been issued is changed, instead of deleting the print data first, thus improving the response characteristics of an operation unit or the like. Then, when the printing apparatus is in a printing standby state, a print data body is deleted in the background, thereby preventing the performance of other functions such as a print function from being inhibited.

In a case where the printing apparatus performs hold printing for a large amount of print data, the print data to which the deletion instruction has been issued may not be deleted and the print data may remain in a storage area until the printing apparatus is brought into the printing standby state. In such a case, in a printing apparatus including a storage area with a low capacity, the storage area is strained, which leads to a deterioration in the processing speed of functions using the storage area.

SUMMARY OF THE INVENTION

According to an aspect of the present invention, a printing apparatus includes the following configuration. The printing apparatus connectable to an external apparatus via a network, and includes a reception unit configured to receive print data from the external apparatus, a storage unit configured to store the print data received by the reception unit in a storage area, a printing unit configured to print an image generated based on the print data on a sheet, a registration unit configured to register, as deletion target print data, print data based on which the image is printed by the printing unit among the print data stored in the storage area, and a deletion unit configured to delete the deletion target print data registered by the registration unit in a case where the printing apparatus is in a predetermined state, wherein the deletion unit deletes the deletion target print data even if the printing apparatus is in the predetermined state in a case where the number of pieces of deletion target print data that are registered by the registration unit and are not deleted yet by the deletion unit reaches a predetermined number.

Further features of the present invention will become apparent from the following description of exemplary embodiments with reference to the attached drawings.

BRIEF DESCRIPTION OF THE DRAWINGS

FIG. 1 is a system configuration diagram illustrating a printing apparatus according to an exemplary embodiment of the present invention.

FIGS. 2A to 2C are configuration diagrams each illustrating a print data management table.

FIG. 3 is a flowchart illustrating print data storage processing in a hold printing system.

FIG. 4 is a flowchart illustrating print processing in the hold printing system.

FIG. 5 is a flowchart illustrating processing executed in a case where an instruction to delete print data in a box area is received.

DESCRIPTION OF THE EMBODIMENTS

Figure 6:
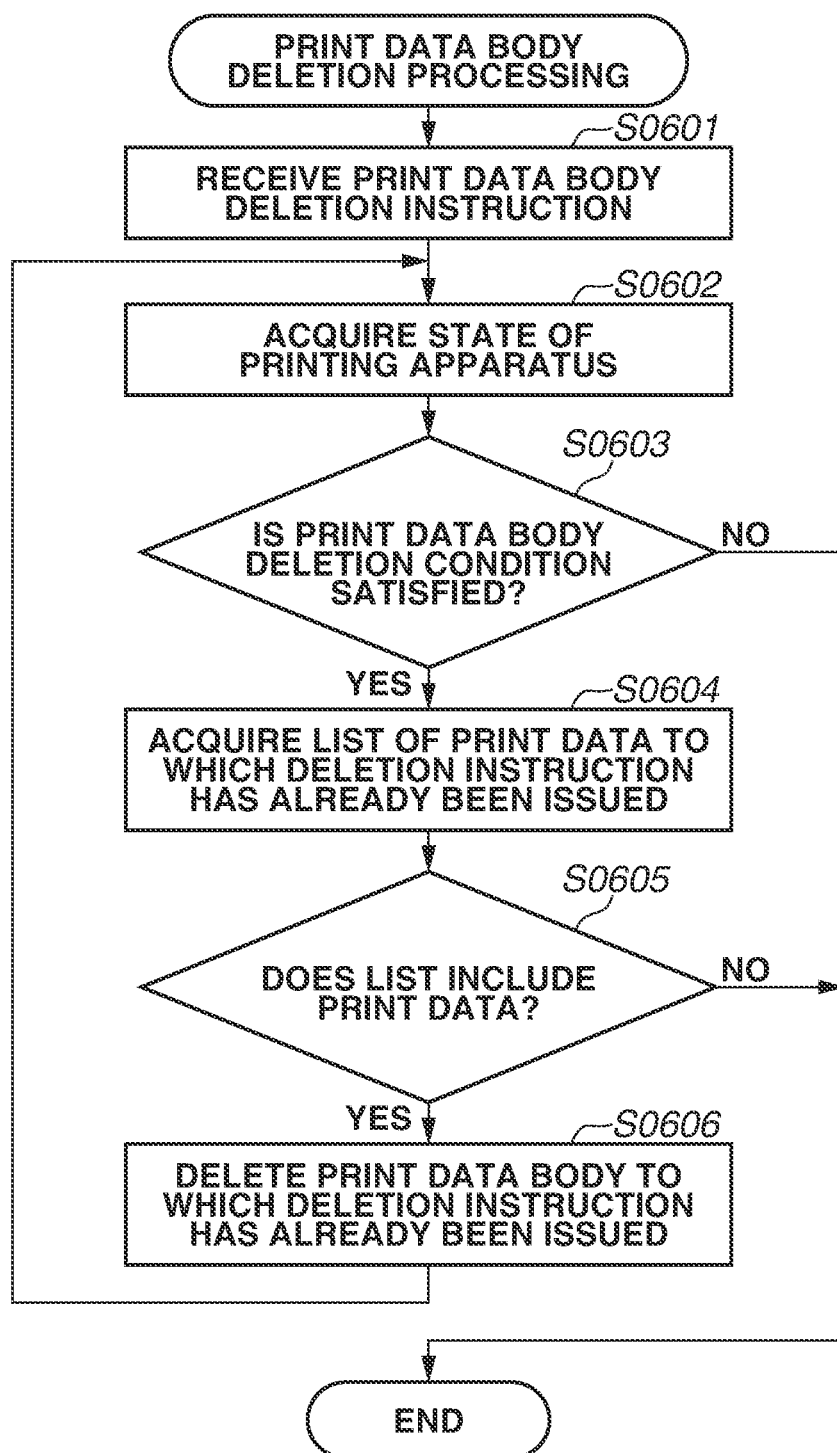
FIG. 6 is a flowchart illustrating processing for deleting a body of print data to which a deletion instruction has been issued in the box area.

Exemplary embodiments for carrying out the present invention will be described below with reference to the accompanying drawings.

<System Configuration>

FIG. 1 is a configuration diagram illustrating a printing system according to an exemplary embodiment of the present invention. A printing apparatus 0101, is connectable to an external apparatus 0116 via a network (local area network (LAN)) 0117. The printer 0101 has the function of printing print data transferred to a device and print data stored in a storage 0107.

A control unit 0102 is connected to a printer engine 0114 which is an image output device. The control unit 0102 is also connected to the network (LAN) 0117. With this configuration, print data and device information are input and output.

In the control unit 0102, a central processing unit (CPU) 0104 is a controller that controls the entire system. A random access memory (RAM) 0105 is a system work memory used for the CPU 0104 to operate. The RAM 0105 is also used as a memory (buffer memory) that temporarily stores input print data. A flash memory 0103 stores system programs. The storage 0107 stores print data and the like. An operation unit interface (I/F) 0109 is an interface unit that communicates with an operation unit 0113, and outputs screen data to be displayed on the operation unit 0113 to the operation unit 0113. The operation unit I/F 0109 also transmits information input by an operator with the operation unit 0113 to the CPU 0104. The operation unit 0113 may be a screen provided to the printer 0101, or a screen remotely provided by a program in the printer 0101 from the external apparatus 0116, such as a host computer. A network I/F 0112 is connected to the network (LAN) 0117 and is used to input and output information. The devices described above are arranged on a system bus 0108.

An image processing unit 0106 includes image processing functions, such as a raster image processor (RIP), an image compression unit, a color space conversion unit, an image rotation unit, a resolution conversion unit, a tone conversion unit, and a printer image processing unit. The RIP rasterizes a page description language (PDL) code into a bitmap image. The image compression unit performs Joint Photographic Experts Group (JPEG) compression/decompression processing on multi-value image data, and performs Joint Bi-level Image Experts Group (JBIG) compression/decompression processing on binary image data. The resolution conversion unit performs resolution conversion processing on image data in a memory, and stores the processed image data in the memory. The color space conversion unit converts, for example, YUV image data in the memory into Lab image data through matrix operations, and stores the Lab image data in the memory. The tone conversion unit converts, for example, 8-bit, 256-tone image data in the memory into 1-bit, 2-tone data with a method such as error diffusion processing, and stores the data in the memory. The printer image processing unit performs correction, processing, and edition on output image data. The image rotation unit rotates image data and stores the image data in the memory. These units can operate in combination with each other. For example, in a case where image rotation and resolution conversion are performed on image data in the memory, both processes can be performed without passing through the memory.

<Hold Printing System>

FIG. 3 is a flowchart illustrating print data storage processing in a hold printing system.

In step S0301, the state of the printing apparatus 0101 is acquired, and in step S0302, the CPU 0104 checks whether the printing apparatus 0101 is in a state where print data can be received from the network (LAN) 0117 (online state). If the printing apparatus 0101 is in the online state (YES in step S0302), the processing proceeds to step S0303. In step S0303, the CPU 0104 checks whether print data has been received from the network (LAN) 0117. If either one of the results indicates "NO" (NO in step S0302 or NO in step S0303), the processing returns to step S0301. If both results indicate "YES", the CPU 0104 receives the print data transmitted via the network I/F 0112 from the external apparatus 0116 connected to the network (LAN) 0117. In step S0304, the CPU 0104 stores the print data in a box area of the storage 0107 (storage area). After the print data is stored in the box area, in step S0305, the CPU 0104 adds information about the received print data in a JobID management table 0201, a box management table 0202, and a box entry table 0204 (described below).

FIG. 2A illustrates the configuration of the JobID management table 0201. A JobID that is unique to an individual piece of print data, management data which is used to manage data, and spec information including a user ID, print data, and device setting information are recorded in a list structure for each job.

FIG. 2B illustrates the configuration of the box management table 0202. The image data stored in the storage 0107 is stored in 100 box areas or a Trashbox area 0203 having a special function. In the Trashbox area 0203, print data to which a deletion instruction has been issued (deletion target print data) is stored. The CPU 0104 periodically deletes the print data stored in the Trashbox area 0203. In the box management table 0202, a boxID, a box name, and the first entry number and the last entry number, each of which has the function of associating the print data, are recorded in a list structure for each box.

FIG. 2C illustrates the configuration of the box entry table 0204. After the print data is stored in the storage 0107, the JobIDs in the box entry table 0204 are checked to find an unregistered array. If the unregistered array is found, the JobID for the array is input, and the last entry number of the box is input as the previous box entry number and "0" is input as the next box entry number.

Next, the subsequent box entries are sequentially tracked from the first entry number of the box, and the box entry with the value "0" is searched for. If the value "0" is found, the value is overwritten with the box entry number currently registered.

FIG. 4 is a flowchart illustrating print processing in the hold printing system.

By a user operating the operation unit 0113 or holding an integrated circuit (IC) card over a card reader 0115, the print data is specified based on a user ID associated with the IC card. The user selects print data from among the specified print data, and in step S0401, the CPU 0104 receives a print instruction for the selected print data.

After the print instruction is received, in step S0402, the state of the printing apparatus 0101 is acquired. The processing proceeds to step S0403. In step S0403, the CPU 0104 checks whether the printing apparatus 0101 is in the online state where print processing for the print data can be performed. If the printing apparatus 0101 is not in the online state (NO in step S0403), the processing returns to step S0402.

If the printing apparatus 0101 is in the online state (YES in step S0403), the processing proceeds to step S0404. In step S0404, the CPU 0104 reads out the print data stored in the box area of the storage 0107 into the RAM 0105. After reading out the print data into the RAM 0105, in step S0405, the CPU 0104 generates image format data for forming an image based on the print data by using the image processing unit 0106.

After generating the image format data, in step S0406, the CPU 0104 transfers the image format data to the printer engine 0114 via a device I/F 0110, and the printer engine 0114 forms an image and prints the image on a sheet. After forming the image, in step S0407, the CPU 0104 issues a deletion instruction for the print data stored in the box area of the storage 0107.

FIG. 5 is a flowchart illustrating processing executed when the CPU 0104 receives the instruction to delete the print data stored in the box area.

Through the processing of step S0407 illustrated in FIG. 4, in step S0501, the CPU 0104 receives the deletion instruction for the print data stored in the box area. After receiving the print data deletion instruction, in step S0502, the CPU 0104 overwrites the box management table 0202 and the box entry table 0204.

More specifically, the entry of the print data to which the deletion instruction is issued is searched for in the box entry table 0204. If the entry of the print data is found, the entry is removed from the link of the existing box. More specifically, the next box entry number of the box entry written as the previous box entry number of the entry of the print data is overwritten with the value of the next box entry number of the entry of the print data. Further, the previous box entry number of the box entry written as the next box entry number of the entry of the print data is overwritten with the value of the previous box entry number of the entry of the print data.

The box entry of the print data is linked to the Trashbox area 0203 in accordance with the method for overwriting the box management table 0202 and the box entry table 0204 at the time of storing print data in the box area as indicated in step S0305. The printed print data is registered as the deletion target print data through the process of step S0502 illustrated in FIG. 5.

After the box management table 0202 and the box entry table 0204 are overwritten, in step S0503, the CPU 0104 issues an instruction to delete a print data body for the print data.

FIG. 6 is a flowchart illustrating processing for deleting the body of the print data to which the deletion instruction has been issued in the box area.

Through the process of step S0503 illustrated in FIG. 5, in step S0601, the CPU 0104 receives a print data body deletion instruction from the hold printing system. After receiving the print data body deletion instruction, the processing proceeds to step S0602. In step S0602, the CPU 0104 acquires the state of the printing apparatus 0101, and the processing proceeds to step S0603. In step S0603, the CPU 0104 checks whether the printing apparatus 0101 satisfies the condition for deleting the print data (deletion target print data) body to which the deletion instruction has been issued in the box area. In order not to prevent the printing of other pieces of print data, the deletion of the body of the print data to which the deletion instruction has been issued in the box area is conditional upon the printing apparatus 0101 being in a printing standby state where the print data is registered and printing of the print data is not executed yet. If the condition for deleting the body of the print data to which the deletion instruction has been issued in the box area is satisfied (YES in step S0603), the processing proceeds to step S0604. In step S0604, the CPU 0104 acquires a list of the print data to which the deletion instruction has been issued. Tracking the linked box entries from the first entry number in the Trashbox area 0203 of the box management table 0202 enables the acquisition of the list of the print data to which the deletion instruction has been issued.

If the acquired list of the print data to which the deletion instruction has been issued includes any items (YES in step S0605), the processing proceeds to step S0606. In step S0606, the body of the print data is deleted from the top of the print data in the list. The CPU 0104 deletes the body of the print data and overwrites the JobID management table 0201, the box management table 0202, and the box entry table 0204. In the JobID management table 0201, the CPU 0104 removes the entry of the print data from the link of the Trashbox area 0203 in accordance with the method for overwriting the box management table 0202 and the box entry table 0204 as indicated in step S0305 at the time of deleting overwriting the print data. The CPU 0104 initializes the value of the entry removed from the link. The CPU 0104 finds the print data from the JobID management table 0201, and the CPU 0104 initializes the list of the found print data.

If one of the bodies of the print data to which the deletion instruction has been issued is deleted, the processing returns to step S0602.

If the condition for deleting the body of the print data to which the deletion instruction has been issued in the box area is not satisfied in step S0603 (NO in step S0603), or if the list of the print data to which the deletion instruction has been issued includes no items in step S0605 (NO in step S0605), the processing is completed.

Figure 7:
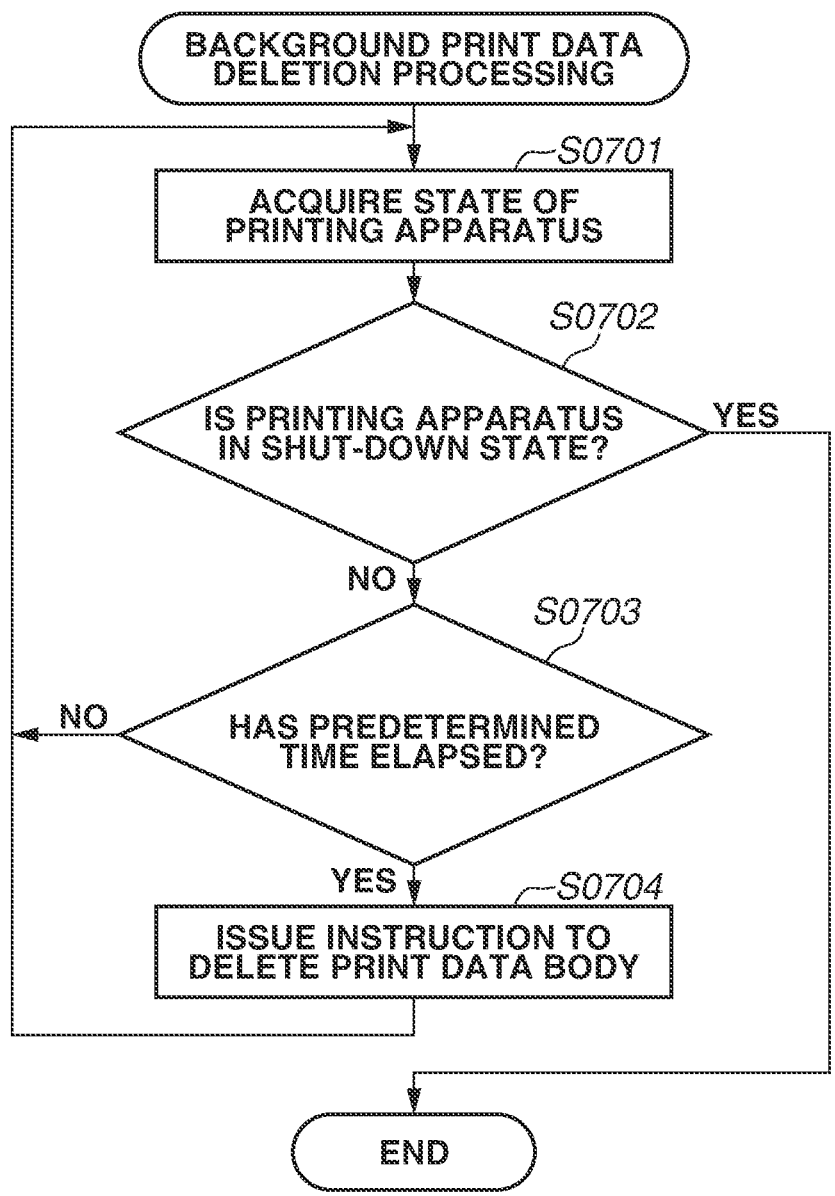
FIG. 7 is a flowchart illustrating background deletion processing for the body of the print data to which the deletion instruction has been issued in the box area.

FIG. 7 is a flowchart illustrating processing for deleting the body of the print data to which the deletion instruction has been issued in the box area, where the processing is performed in the background.

After the printing apparatus 0101 is started up, in step S0701, the CPU 0104 acquires the state of the printing apparatus 0101, and in step S0702, the CPU 0104 checks whether the printing apparatus 0101 is in a shut-down state. If the printing apparatus 0101 is not in the shut-down state (NO in step S0702), the processing proceeds to step S0703. In step S0703, the CPU 0104 checks whether a predetermined time has elapsed from the start-up or the issuance of the print data body deletion instruction in step S0704 of the processing flow. If the predetermined time has elapsed (YES in step S0703), the processing proceeds to step S0704. In step S0704, the CPU 0104 issues an instruction to delete the body of the print data to which the deletion instruction has been issued in the box area. After the issuance of the print data body deletion instruction, or if the predetermined time has not elapsed in step S0703 (NO in step S0703), the processing returns to step S0701. If the printing apparatus 0101 is in the shut-down state (YES in step S0702), the processing is completed.

<Exemplary Embodiments of the Present Invention>

Figure 8:
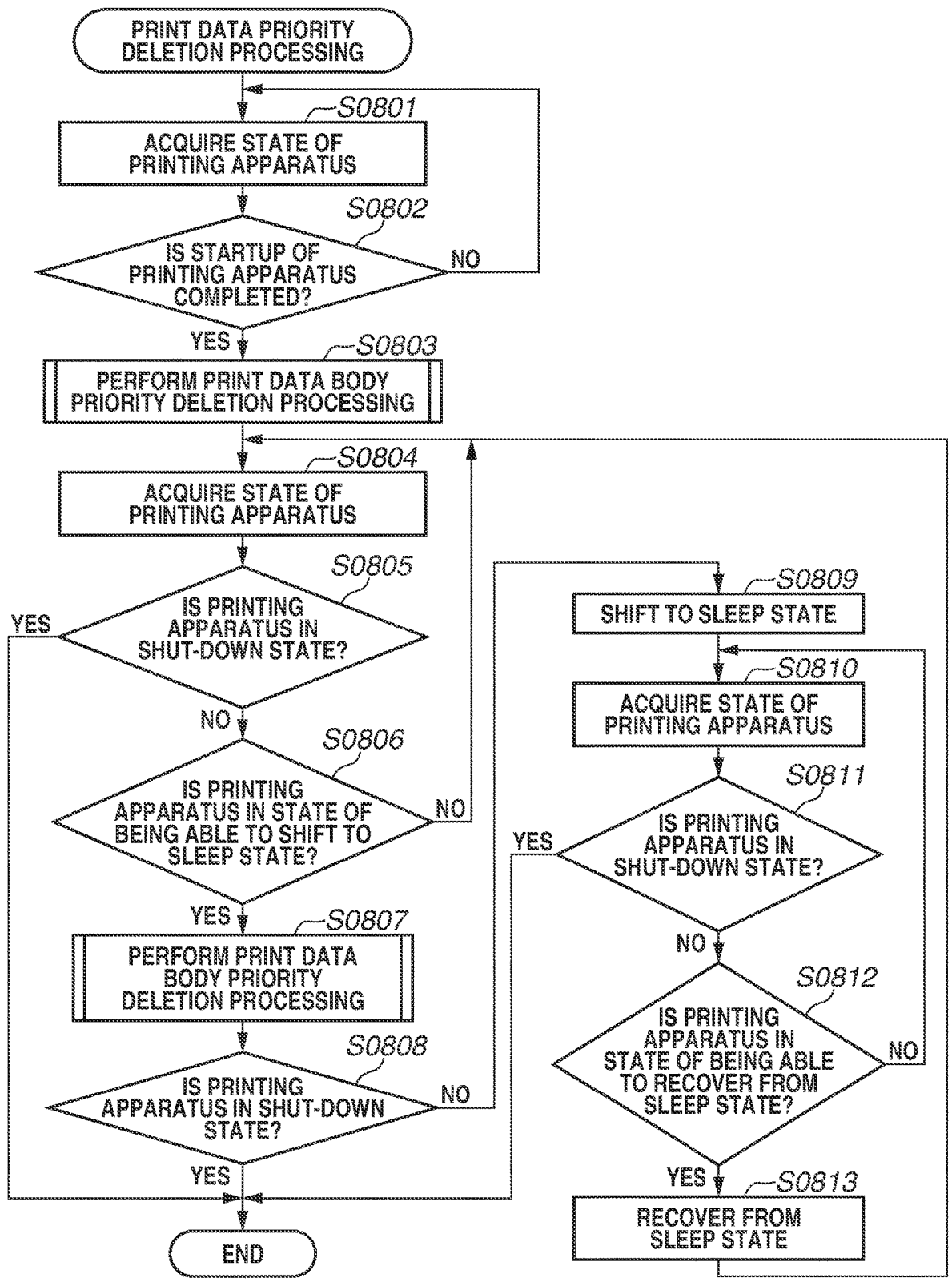
FIG. 8 is a flowchart illustrating priority deletion processing for the print data to which the deletion instruction has been issued in the box area in the printing apparatus according to an exemplary embodiment of the present invention.

FIG. 8 is a flowchart illustrating processing for deleting, on a priority basis, the print data to which the deletion instruction has been issued in the box area in the printing apparatus 0101 (hereinafter, referred to as priority deletion) according to an exemplary embodiment of the present invention.

In step S0801, the CPU 0104 acquires the state of the printing apparatus 0101, and in S0802, the CPU 0104 checks whether start-up of the printing apparatus 0101 is completed. If the start-up is not completed (NO in step S0802), the processing returns to step S0801. If the start-up is completed (YES in step S0802), the processing proceeds to step S0803. In step S0803, the processing for the priority deletion of the body of the print data to which the deletion instruction has been issued is performed.

After the priority deletion has been performed, in step S0804, the CPU 0104 acquires the state of the printing apparatus 0101. In step S0805, the CPU 0104 checks whether the printing apparatus 0101 is in the shut-down state. If the printing apparatus 0101 is not in the shut-down state (NO in step S805), the processing proceeds to step S806. In step S0806, the CPU 0104 checks whether the printing apparatus 0101 is in the state of being able to shift to a sleep state. If the printing apparatus 0101 is in the shut-down state (YES in step S0805), the processing is completed. If the printing apparatus 0101 is not in the shut-down state (NO in step S0805) and is not in the state of being able to shift to the sleep state (NO in step S0806), the processing returns to step S0804.

If the printing apparatus 0101 is not in the shut-down state (NO in step S0805) and is in the state of being able to shift to the sleep state (YES in step S0806), the processing proceeds to step S0807. In step S0807, the processing for priority deletion of the body of the print data to which the deletion instruction has been issued is performed. If it is determined that the printing apparatus 0101 is in the shut-down state in the processing for the priority deletion of the body of the print data to which the deletion instruction has been issued, the processing is completed. If the printing apparatus 0101 is in a state other than the shut-down state (NO in step S0808), the processing proceeds to step S0809.

In step S0809, the printing apparatus 0101 is shifted into the sleep state after completion of the processing of the priority deletion for the body of the print data to which the deletion instruction has been issued.

After the printing apparatus 0101 is shifted to the sleep state, in step S0810, the CPU 0104 acquires the state of the printing apparatus 0101. In step S0811, the CPU 0104 checks whether the printing apparatus 0101 is in the shut-down state. If the printing apparatus 0101 is not in the shut-down state (NO in step S0811), the processing proceeds to step S0812. In step S0812, the CPU 0104 checks whether the printing apparatus 0101 is in the state of being able to recover from the sleep state. If the printing apparatus 0101 is in the shut-down state (YES in step S0811), the processing is completed. If the printing apparatus 0101 is not in the shut-down state (NO in step S0811) and is not in the state of being able to recover from the sleep state (NO in step S0812), the processing returns to step S0810.

If the printing apparatus 0101 is not in the shut-down state (NO in step S0811) and is in the state of being able to recover from the sleep state (YES in step S0812), the processing proceeds to step S0813. In step S0813, the CPU 0104 resumes the printing apparatus 0101 from the sleep state. After the printing apparatus 0101 is resumed from the sleep state, the processing returns to step S0804.

Figure 9:
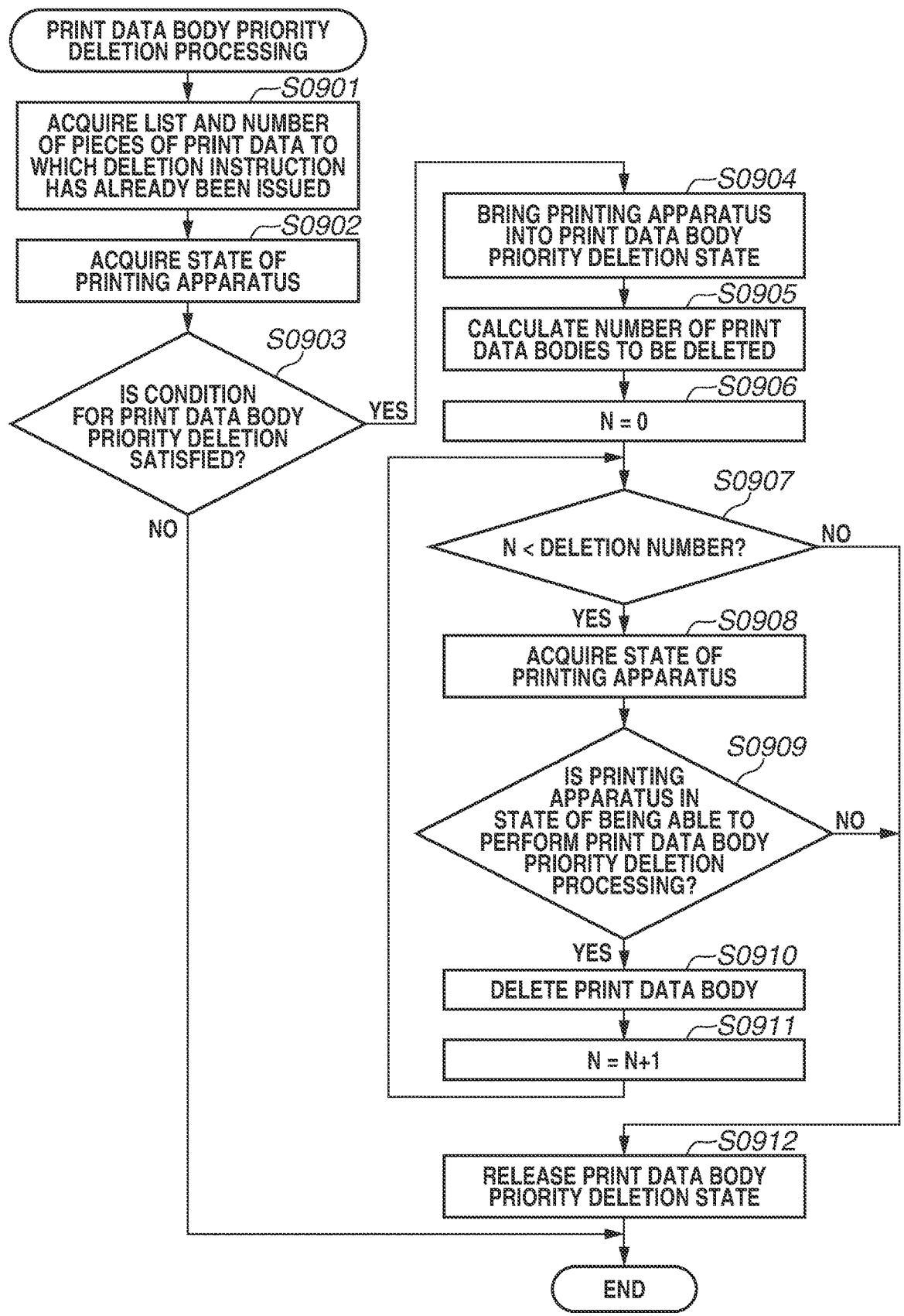
FIG. 9 is a flowchart illustrating priority deletion processing for the body of the print data to which the deletion instruction has been issued in the box area in the printing apparatus according to an exemplary embodiment of the present invention.

FIG. 9 is a flowchart illustrating processing for the priority deletion of the body of the print data to which the deletion instruction has been issued in the box area in the printing apparatus 0101 according to the exemplary embodiment of the present invention.

The CPU 0104 acquires the list of the print data to which the deletion instruction has been issued, with the method indicated in step S0604. In step S0901, the number of box entries of the acquired print data to which the deletion instruction has been issued is counted and the number of pieces of print data to which the deletion instruction has been issued is also acquired.

Next, in step S0902, the CPU 0104 acquires the state of the printing apparatus 0101, and in step S0903, the CPU 0104 checks whether the printing apparatus 0101 satisfies the condition for the priority deletion of the body of the print data to which the deletion instruction has been issued in the box area. In order not to prevent printing of other pieces of print data, deleting, on a priority basis, of the body of the print data to which the deletion instruction has been issued in the box area is conditional upon the number of pieces of print data to which the deletion instruction has been issued being greater than or equal to a predetermined number. If the condition for the priority deletion of the body of the print data to which the deletion instruction has been issued is not satisfied, the processing is completed.

If the condition for the priority deletion of the body of the print data to which the deletion instruction has been issued is satisfied (YES in step S0903), the processing proceeds to step S0904. In step S0904, the CPU 0104 brings the printing apparatus 0101 into a print data body priority deletion state. In the print data body priority deletion state according to the present exemplary embodiment, the printing apparatus 0101 is in an off-line state. The off-line state indicates a state where print data is not received from the external apparatus 0116, or a state where the printing apparatus 0101 is prevented from receiving print data from the external apparatus 0116.

After the printing apparatus 0101 is shifted to the print data body priority deletion state, the CPU 0104 calculates a deletion number, the number of bodies of the print data which are to be deleted in this processing and to which the deletion instruction has been issued. In order not to prevent printing of other pieces of print data, the deletion number is set to the number of bodies of the print data bodies to which the deletion instruction has been issued, as an upper limit.

In step S0906, the CPU 0104 sets a variable N to an initial value 0, and in step S0907, the CPU 0104 compares the variable N with the deletion number. If the variable N is greater than or equal to the number of the deletion number (NO in step S0907), the processing proceeds to step S0912.

If the variable N is less than the deletion number (YES in step S0907), the processing proceeds to step S0908. In step S0908, the CPU 0104 acquires the state of the printing apparatus 0101. In step S0909, the CPU 0104 checks whether the printing apparatus 0101 is in the state of being able to delete the body of the print data to which the deletion instruction has been issued in the box area. In the present exemplary embodiment, if the printing apparatus 0101 is in the shut-down state, the printing apparatus 0101 is brought into the state of being able to delete the body of the print data to which the deletion instruction has been issued in the box area. If the printing apparatus 0101 is not in the state of being able to delete the print data body to which the deletion instruction has been issued in the box area, the processing proceeds to step S0912.

If the printing apparatus 0101 is in the state of being able to delete the body of the print data to which the deletion instruction has been issued in the box area (YES in step S0909), the processing proceeds to step S0910. In step S0910, the CPU 0104 deletes the body of the print data to which the deletion instruction has been issued, through the method indicated in step S0606. After the deletion of the body of the print data to which the deletion instruction has been issued, in step S0911, the variable N is added by one, and then the processing returns to step S0907. In step S0912, the CPU 0104 releases the print data body priority deletion state and completes the processing.

As described above, according to the exemplary embodiments of the present invention, if the number of pieces of print data to which the deletion instruction has been issued in the box area is greater than or equal to the predetermined number, the printing apparatus 0101 is temporarily brought into the off-line state, and the print data to which the deletion instruction has been issued is deleted in a priority basis. This configuration enables the body of the print data to which the deletion instruction has been issued to be prevented from being left in a storage area, while minimizing the inhibition of printing of other pieces of print data.

Other Exemplary Embodiments

According to the above-described exemplary embodiments, as the condition for priority deletion of the print data to which the deletion instruction has been issued in the box area, the number of pieces of print data to which the deletion instruction has been issued in the box area is provided. However, the condition is not limited to this. The amount of the entire print data to which the deletion instruction has been issued in the box area may be set as the condition. In such a case, if the amount of the print data to which the deletion instruction has been issued in the box area reaches or exceeds a predetermined amount, the printing apparatus 0101 is shifted to a state where print data is not received.

According to the above-described exemplary embodiments, the off-line state is set as the state of priority deletion of the print data to which the deletion instruction has been issued in the box area. However, the state is not limited to the off-line state. In some embodiments, setting the priority of a task for deleting the body of the print data to which the deletion instruction has been issued in the box area to be relatively higher than the priorities of other tasks realizes the configuration.

According to the above-described exemplary embodiments, the timing for determining the priority deletion of the print data to which the deletion instruction has been issued in the box area is set after the completion of start-up and at the time of shifting to the sleep state. However, the timing is not limited to these.

According to the above-described exemplary embodiments, the upper limit of the deletion number, that is, the number of the print data to which the deletion instruction has been issued in the box area and which is to be deleted in a priority basis, is set. However, the configuration of the present invention is not limited thereto. A configuration in which the upper limit is not set is applicable, or a configuration in which the upper limit of the amount of print data to be deleted is set is also applicable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-007185, filed Jan. 19, 2018, which is hereby incorporated by reference herein in its entirety.

What is claimed is:

1. A printing apparatus which is able to communicate with an external apparatus, the printing apparatus comprising:
a reception unit configured to receive print data from the external apparatus;
a storage unit configured to store the print data received by the reception unit in a storage area;
a printing unit configured to print an image based on the print data on a sheet;
a registration unit configured to register, as deletion target print data, print data based on which the image is printed by the printing unit among the print data stored in the storage area; and
a deletion unit configured to delete the deletion target print data registered by the registration unit in a case where the printing apparatus is in a predetermined state,
wherein the deletion unit deletes the deletion target print data even if the printing apparatus is not in the predetermined state in a case where the number of pieces of deletion target print data that are registered by the registration unit and are not deleted yet by the deletion unit reaches a predetermined number.

2. The printing apparatus according to claim 1, wherein the predetermined state includes a state where the printing apparatus is in a printing standby state.

3. The printing apparatus according to claim 1, further comprising a control unit configured to perform control to shift the printing apparatus into a state where reception of print data by the reception unit is not accepted in a case where the number of pieces of deletion target print data that are registered by the registration unit and are not deleted yet by the deletion unit reaches the predetermined number.

4. The printing apparatus according to claim 3, wherein after deletion of the deletion target print data, the control unit shifts the printing apparatus from the state where print data is not received into a state where the reception of print data by the reception unit is accepted.

5. The printing apparatus according to claim 3, wherein the state where the reception of print data by the reception unit is not accepted includes a state where the printing apparatus is in an off-line state.

6. A printing apparatus which is able to communicate with an external apparatus, the printing apparatus comprising:
a reception unit configured to receive print data from the external apparatus;
a storage unit configured to store the print data received by the reception unit in a storage area;
a printing unit configured to print an image based on the print data on a sheet;
a registration unit configured to register, as deletion target print data, print data based on which the image is printed by the printing unit among the print data stored in the storage area; and
a deletion unit configured to delete the deletion target print data registered by the registration unit in a case where the printing apparatus is in a predetermined state,
wherein the deletion unit deletes the deletion target print data even if the printing apparatus is not in the predetermined state in a case where an amount of the deletion target print data that is registered by the registration unit and is not deleted yet by the deletion unit reaches a predetermined amount.

7. The printing apparatus according to claim 6, wherein the predetermined state includes a state where the printing apparatus is in a printing standby state.

8. The printing apparatus according to claim 6, further comprising a control unit configured to perform control to shift the printing apparatus into a state where reception of print data by the reception unit is not accepted in a case where the amount of the deletion target print data that is registered by the registration unit and is not deleted yet by the deletion unit reaches the predetermined amount.

9. The printing apparatus according to claim 8, wherein after deletion of the deletion target print data, the control unit shifts the printing apparatus from the state where print data is not received into a state where the reception of print data by the reception unit is accepted.

10. The printing apparatus according to claim 8, wherein the state where the reception of print data by the reception unit is not accepted includes a state where the printing apparatus is in an off-line state.

11. A non-transitory computer-readable storage medium storing a program for causing a computer to execute a control method for a printing apparatus which is able to communicate with an external apparatus, the control method comprising:
    receiving print data from the external apparatus;
    storing the received print data in a storage area;
    printing an image based on the print data on a sheet;
    registering, as deletion target print data, print data based on which the image is printed among the print data stored in the storage area; and
    deleting the registered deletion target print data in a case where the printing apparatus is in a predetermined state,
    performing control to delete the deletion target print data even if the printing apparatus is not in the predetermined state in a case where the number of pieces of deletion target print data that are registered and are not deleted yet reaches a predetermined number.

12. The printing apparatus according to claim 1, wherein the printing apparatus is able to communicate with the external apparatus via a network.

13. A printing apparatus connectable to an external apparatus, the printing apparatus comprising:
    a reception unit configured to receive print data from the external apparatus;
    a storage unit configured to store the print data received by the reception unit in a storage area;
    a printing unit configured to print an image based on the print data on a sheet;
    a registration unit configured to register, as deletion target print data, print data based on which the image is printed by the printing unit among the print data stored in the storage area;
    a deletion unit configured to delete the deletion target print data registered by the registration unit when the printing apparatus is not executing printing; and
    a control unit configured to perform control to shift the printing apparatus into a power saving mode in a case where a predetermined condition is satisfied,
    wherein the deletion unit deletes all deletion target print data that are registered by the registration unit before the printing apparatus is shifted into the power saving mode in a case where the predetermined condition is satisfied and the number of pieces of deletion target print data that are registered by the registration unit and are not deleted yet by the deletion unit reaches a predetermined number.

14. The printing apparatus according to claim 13, wherein the control unit performs control to shift the printing apparatus into a state where reception of print data by the reception unit is not accepted in a case where the predetermined condition is satisfied and the number of pieces of deletion target print data that are registered by the registration unit and are not deleted yet by the deletion unit reaches the predetermined number.

15. The printing apparatus according to claim 14, wherein after deletion of the deletion target print data, the control unit shifts the printing apparatus from the state where print data is not received into a state where the reception of print data by the reception unit is accepted.

16. The printing apparatus according to claim 14, wherein the state where the reception of print data by the reception unit is not accepted includes a state where the printing apparatus is in an off-line state.

17. The printing apparatus according to claim 13, wherein the printing apparatus is able to communicate with the external apparatus via a network.

18. A printing apparatus connectable to an external apparatus, the printing apparatus comprising:
    a reception unit configured to receive print data from the external apparatus;
    a storage unit configured to store the print data received by the reception unit in a storage area;
    a printing unit configured to print an image based on the print data on a sheet;
    a registration unit configured to register, as deletion target print data, print data based on which the image is printed by the printing unit among the print data stored in the storage area;
    a deletion unit configured to delete the deletion target print data registered by the registration unit when the printing apparatus is not executing printing; and
    a control unit configured to perform control to shift the printing apparatus into a power saving mode in a case where a predetermined condition is satisfied,
    wherein the deletion unit deletes all deletion target print data that are registered by the registration unit before the printing apparatus is shifted into the power saving mode in a case where the predetermined condition is satisfied and an amount of deletion target print data that are registered by the registration unit and are not deleted yet by the deletion unit reaches a predetermined number.

* * * * *